United States Patent
Hosie et al.

(10) Patent No.: US 7,856,239 B2
(45) Date of Patent: Dec. 21, 2010

(54) MOBILE PHONE TELEPHONY INVOLVING THE SENDING AND RECEIVING OF TEXT MESSAGES

(75) Inventors: Nadia Hosie, Poole (GB); Mary Benham, Bournemouth (GB); Henry John Babbage, Worth Matravers (GB); Stephen Ian Martin, Poole (GB)

(73) Assignee: Ericsson AB, Stockholm (SE)

( * ) Notice: Subject to any disclaimer, the term of this patent is extended or adjusted under 35 U.S.C. 154(b) by 115 days.

(21) Appl. No.: 10/488,044

(22) PCT Filed: Aug. 23, 2002

(86) PCT No.: PCT/GB02/03905

§ 371 (c)(1),
(2), (4) Date: Sep. 9, 2004

(87) PCT Pub. No.: WO03/021983

PCT Pub. Date: Mar. 13, 2003

(65) Prior Publication Data

US 2005/0020268 A1    Jan. 27, 2005

(30) Foreign Application Priority Data

Aug. 31, 2001 (GB) .................................. 0121094.7

(51) Int. Cl.
*H04W 4/00* (2009.01)
*H04W 40/00* (2009.01)
*H04M 11/00* (2006.01)
*H04B 7/00* (2006.01)

(52) U.S. Cl. .................. 455/466; 455/406; 455/517; 455/445

(58) Field of Classification Search .......... 455/445, 455/466, 418, 419, 405, 406
See application file for complete search history.

(56) References Cited

U.S. PATENT DOCUMENTS

| 5,629,974 | A | | 5/1997 | Rajala et al. |
| 6,088,431 | A | * | 7/2000 | LaDue .................... 379/114.2 |
| 6,327,355 | B1 | * | 12/2001 | Britt ...................... 379/201.03 |
| 6,430,406 | B1 | * | 8/2002 | Frisk .......................... 455/407 |
| 6,711,240 | B2 | * | 3/2004 | Contractor ............... 379/88.12 |
| 6,718,178 | B1 | * | 4/2004 | Sladek et al. ............... 455/466 |
| 6,778,822 | B1 | * | 8/2004 | Visser et al. ............. 455/422.1 |

(Continued)

FOREIGN PATENT DOCUMENTS

EP    1 107 617 A2    10/2000

(Continued)

*Primary Examiner*—George Eng
*Assistant Examiner*—Wesley L Kim
(74) *Attorney, Agent, or Firm*—Kirschstein, et al.

(57) ABSTRACT

A method of operating a mobile phone telecommunications network is provided, comprising using at least one mobile switching center (MSC) of the network to receive at least one message, and as a result to generate a mobile application part (MAP) message, transmitting the MAP message from the MSC to at least one service control point (SCP) of the network, and operating the SCP to process the MAP message. Processing of the MAP message by the SCP may comprise, for example, determining the subsequent handling of the MAP message, and charging a sender of the message received by the MSC. The message received by the MSC may comprise a text message, for example, a text message generated using the short message service (SMS).

30 Claims, 1 Drawing Sheet

U.S. PATENT DOCUMENTS

| | | | |
|---|---|---|---|
| 7,145,875 B2 * | 12/2006 | Allison et al. | 370/230.1 |
| 2001/0039191 A1 | 11/2001 | Maierhofer | |
| 2002/0177454 A1 * | 11/2002 | Karri et al. | 455/466 |
| 2003/0091170 A1 * | 5/2003 | McCann et al. | 379/114.2 |

FOREIGN PATENT DOCUMENTS

| | | |
|---|---|---|
| WO | WO 01/01708 A1 | 1/2001 |
| WO | WO 01/19104 A1 | 3/2001 |

\* cited by examiner

MOBILE PHONE TELEPHONY INVOLVING THE SENDING AND RECEIVING OF TEXT MESSAGES

BACKGROUND OF THE INVENTION

This invention relates to mobile phone telephony, and particularly, but not exclusively, to mobile phone telephony involving the sending and receiving of text messages using the short message service (SMS).

Conventionally, mobile phone telephony networks include mobile switching centres (MSCs) for switching of application part messages, for example mobile application part (MAP) messages or CAMEL application part (CAP) messages, around the network from sender to receiver, and service control points (SCPs) which provide intelligent networks (INs) for control of the handling of the messages in the network according to a call model such as CAMEL2 (Customized Applications for Mobile Network Enhanced Logic 2). For example, speech messages sent from a pre-pay mobile phone are switched by an MSC to a receiver. The MSC alerts an SCP that a call has been made, and the SCP debits the account of the sender. In the case of SMS text messages, however, these are switched by an MSC to a short message service centre (SMSC) and on to the receiver. Neither the MSC nor the SMSC alerts the SCP that a message has been sent, and the SCP cannot therefore charge for the message at the time it is sent. Instead the SMS text message can only be charged for once it has reached the SMSC, this is usually achieved by down-loading message details for post-processing off-line. By the time this is achieved, the recipient may already have retrieved the message. The sender may be using a pre-pay mobile phone and may not have had sufficient credit to send the SMS text message. This is only detected after the message has been sent to the SMSC, i.e. delivery of the message can be effectively free which is undesirable to the network providers. It is desirable for credit to be checked and charges levied before onward transmission of the SMS text message to the SMSC. Onward transmission can thereby be prevented if the sender bas insufficient credit.

SUMMARY OF THE INVENTION

WO 01/01708 (Nokia Networks OY) teaches a method of operating a mobile phone telecommunications network, comprising using at least one mobile switching centre (MSC) of the network to receive at least one message and, as a result, to generate a mobile application part (MAP) message, transmitting the MAP message from the MSC to at least one service control point (SCP) of the network, and operating the SCP to process the MAP message.

Furthermore, WO 01/01708 also discloses a mobile phone telecommunications network comprising at least one mobile switching centre (MSC) having a message receiver, a MAP message generator, and a MAP message transmitter, and at least one service control point (SCP) having a MAP message receiver and a MAP message processor, wherein the message receiver of the MSC receives at least one message and as a result thereof the MAP message generator of the MSC generates a MAP message and the MAP message transmitter of the MSC sends this to the MAP message receiver of the SCP, and the MAP message receiver of the SCP receives the MAP message and MAP message processor of the SCP processes the MAP message.

WO 01/01708 also teaches service control point (SCP) comprising a receiver for receiving at least one MAP message, and a processor for processing the MAP message.

According to a first aspect of the present invention there is provided a method of operating a mobile phone telecommunications network characterised in that processing of the MAP message by the SCP comprises determining the subsequent handling of the MAP message.

The message received by the MSC may comprise a signaling message, for example relating to the connection of a speech message. The message received by the MSC may comprise a text message, for example a text message generated using the short message service (SMS), an 'SMS text message'. The MSC may receive the message from, for example, a mobile phone or from a management system of the network. The MAP message generated by the MSC may contain information about the message received by the MSC. The MAP message generated by the MSC may contain at least part of the message received by the MSC. For example, when the message received by the MSC comprises a text message, the MAP message generated by the MSC may contain part or all of the text of the text message.

Processing of the MAP message by the SCP may comprise interrogation of the MAP message. For example, processing of the MAP message by the SCP may comprise interrogation of the MAP message to obtain information from the MAP message.

Processing of the MAP message by the SCP may comprise determining whether or not the MAP message should be sent onwards towards an intended receivers. Processing of the MAP message by the SCP may comprise interrogation of the MAP message to obtain information from the MAP message, and using the information in determining the subsequent handling of the MAP message. For example, the information may comprise details of the identity of the sender of the message received by the MSC, and may be used to access an account of the sender and to determine whether or not there is sufficient credit to allow sending of the message onwards towards an intended receiver. The information may comprise details of the identity of the sender of the message received by the MSC, and may be used in determining whether or not messages from such a sender should be sent onwards towards an intended receiver.

When processing of the MAP message by the SCP comprises determining that the MAP message should not be sent onwards towards an intended receiver, the SCP maybe used to discard the MAP message.

When processing of we MAP message by the SCP comprises determining that the MAP message should be sent onwards towards an intended receiver, the SCP may send the MAP message onwards towards the receiver by sending it to one or more MSCs, or one or more store and forward centres. The SCP may change the destination address of the MAP message to send it onwards towards the receiver. When the MAP message received by the SCP comprises an SMS text MAP message, i.e. a MAP message generated by the MSC as a result of receiving an SMS text message, the SCP may send the SMS text MAP message onwards towards the receiver by sending it to a short message service centre (SMSC).

The SCP may be operated to expect to receive a notification message containing information on successful sending of the MAP message onwards towards an intended receiver. The SCP may be operated to use a lack of receipt of the notification message to, for example, trigger crediting of the account of the sender of the message to the MSC.

Processing of the MAP message by the SCP may comprise charging a sender of the message received by the MSC. For example, processing of the MAP message by the SCP may comprise charging a sender of the message received by the MSC if the MAP message is sent onwards towards an intended receiver. Processing of the MAP message by the SCP may comprise charging a sender of the message received by the MSC before the MAP message is sent onwards towards an intended receiver. Thus 'real-time' charging is possible. Processing of the MAP message by the SCP may comprise interrogation of the MAP message to obtain information from the MAP message, and using the information in charging a sender of the message received by the MSC. For example, the information may comprise details of the identity of the sender of the message received by the MSC, and may be used to access an account of the sender and to charge the sender. The information may comprise details of the length of the MAP message, and may be used to charge the sender.

Processing of the MAP message by the SCP may comprise triggering dispatch of a message to the sender of the message received by the MSC. Processing of the MAP message by the SCP may comprise interrogation of the MAP message to obtain information from the MAP message, and using the information in triggering dispatch of a message to the sender of the message received by the MSC. For example, the information may comprise details of the identity of the sender of the message received by the MSC, and may be used to access an account of the sender, to determine the credit available, and to trigger dispatch of a message to the sender if the credit is insufficient to allow sending of the message onwards towards an intended receiver.

Processing of the MAP message by the SCP may comprise analysis of the MAP message. Processing of the MAP message by the SCP may comprise interrogation of the MAP message to obtain information from the MAP message, and using the information in analysis of the MAP message. A number of MAP messages may be received by the SCP, and processing of these messages may comprise interrogating the messages to obtain information therefrom, and using the information to perform an analysis of the MAP messages, for example to analyse the sources of the MAP messages.

The SCP may provide one or more service logic programs (SLPs). Each SLP may define one or more processes carried out by the SCP. Processing of the MAP message by the SCP may comprise running one or more SLPs. Processing of the MAP message by the SCP may comprise using the MAP message to trigger running of one or more SLPs.

The MAP message received by the SCP may comprise an SMS text MAP message, i.e. a MAP message generated by the MSC as a result of receipt of an SMS text message. The SMS text MAP message may comprise part or all of the text of the SMS text message. The SCP may provide one or more SLPs, 'SMS SLPs', which define one or more processes carried out by the SCP on SMS text MAP messages. Processing of an SMS text MAP message by the SCP may comprise running one or more SMS SLPs. Processing of an SMS text MAP message by the SCP may comprise using the SMS text MAP message to trigger running of one or more SMS SLPs.

The invention may be readily implemented in known mobile phone telecommunications networks, such as CAMEL2 telecommunications networks. Such networks include one or more SCPs which are already configured to accept MAP messages, therefore modification of the SCP hardware is not necessary. Such networks may also include one or more SMSCs which are already configured to accept SMS text MAP messages, and no modification of the SMSC hardware is necessary. To implement the invention in known networks it is necessary to change the destination address of the MAP messages generated by the MSC as a result of the messages received by the MSC, so that the MAP messages are directed to the SCP. This is a straightforward modification, and can be made by modifying data held in the MSC, or by programming the SCP address into the SIM cards of mobile phones already subscribing to the network and new phones being introduced to the network, such addresses then being passed on to the generated MAP messages. The operator of the network has the option of changing the address for certain types of mobile phone calls or certain groups of customers. The invention therefore has generic application, i.e. it can be implemented in a variety of different networks, network specific alterations are not necessary.

According to a second aspect of the present invention there is provided a mobile phone telecommunications network characterized in that the MAP message processor determines whether or not the MAP message should be sent onwards towards an intended receiver.

The MAP message generated by the MSC and received by the SCP may comprise an SMS text MAP message, i.e. a MAP message generated by the MSC as a result of receipt of an SMS text message. The SMS text MAP message generated by the MSC may contain part or all of the text of the SMS text message. Processing of the MAP message by the SCP processor may comprise, for example, interrogation of the MAP message, determining the subsequent handling of the MAP message, charging a sender of the message received by the MSC, triggering dispatch of a message to a sender of the message received by the MSC, analysis of the MAP message.

According to a third aspect of the present invention there is provided a service control point (SCP) characterized in that the processor determines whether or not the MAP message should be sent onwards towards the intended receiver.

The SCP may comprise a computer. The SCP receiver may provide or access software for receiving the MAP message. The SCP processor may provide or access software for processing the MAP message. Processing of the MAP message by the SCP processor may comprise, for example, interrogation of the MAP message, determining the subsequent handling of the MAP message, charging a sender of the message received by the MSC, triggering dispatch of a message to a sender of the message received by the MSC, analysis of the MAP message. The processing software may comprise one or more service logic programs (SLPs). Each SLP may define one or more processes carried out by the SCP. Processing of a MAP message by the SCP processor of the SCP may comprise running one or more SLPs. Processing of a MAP message by the SCP may comprise using the MAP message to trigger running of one or more SLPs. The MAP message received by the MAP message receiver of the SCP may comprise an SMS text MAP message, i.e. a MAP message generated by the MSC as a result of receipt of an SMS text message. The processing software may comprise one or more SLPs, 'SMS SLPs', which define one or more of the processes carried out by the SCP processor of the SCP on SMS text MAP messages. Processing of an SMS text MAP message by the SCP processor of the SCP may comprise ruing one or more SLPs. Processing of an SMS text MAP message by the SCP may comprise using the SMS text MAP message to tagger running of one or more SMS SLPs. The SCP may comprise a transmitter for sending the MAP message onwards towards an intended receiver.

BRIEF DESCRIPTION OF THE DRAWINGS

An embodiment of the second aspect of the present invention will now be described by way of example only, with reference to the accompanying drawings, in which.

DETAILED DESCRIPTION OF THE PREFERRED EMBODIMENTS

Figure 1:
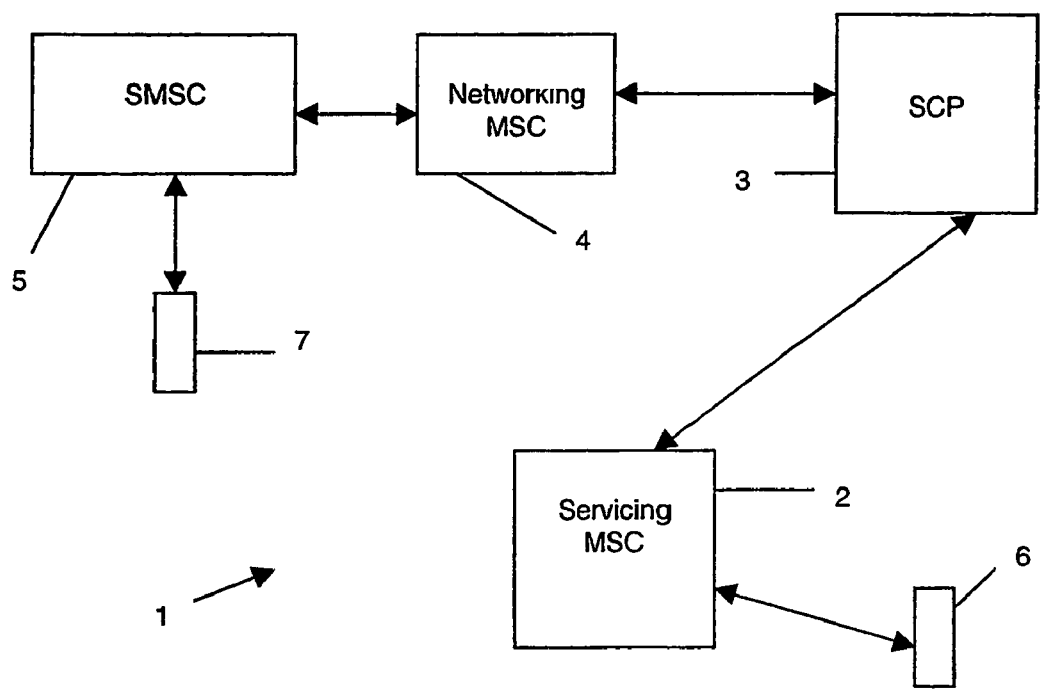
FIG. 1 is a schematic representation of a mobile phone telecommunications network according to the present invention.

With reference to FIG. 1, the mobile phone telecommunications network 1 comprises a servicing mobile switching centre (MSC) 2, a service control point (SCP) 3, a networking mobile switching centre (MSC) 4, and a short message service centre (SMSC) 5. The servicing MSC 2 is connected to the SCP 3, the SCP 3 is connected to the networking MSC 4, and the networking MSC 4 is connected to the SMSC 5, as shown. The connections allow two-way transmission of messages between the various components of the network.

In this embodiment, a text message is sent via the short message service (SMS) from a mobile phone 6 of a sender to the servicing MSC 2. As a result of the receipt of the SMS text message, the servicing MSC 2 generates an SMS text MAP message which contains the text of the SMS text message. The SMS text MAP message is sent to the SCP 3, which receives and processes it. If appropriate, the SCP 3 then sends the SMS text MAP message to the networking MSC 4. The networking MSC 4 receives the SMS text MAP message and sends it to the SMSC 5. The SMSC 5 receives the SMS text MAP message and sends it to the mobile phone 7 of a receiver.

Figure 2:
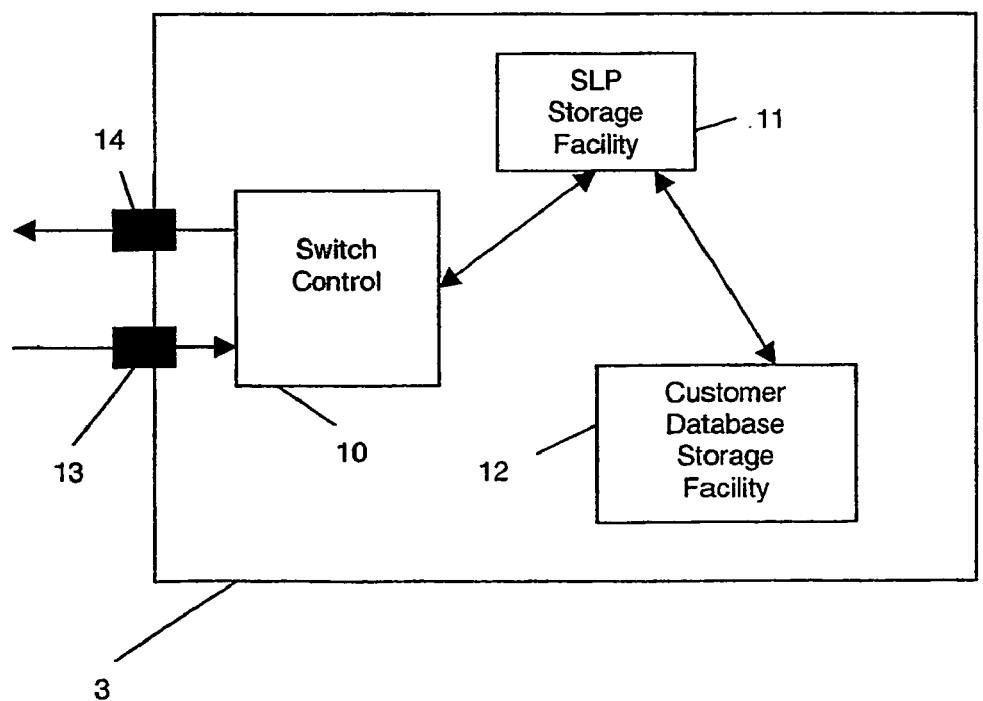
FIG. 2 is a schematic representation of the service control point (SCP) of the network of FIG. 1.

The structure of the SCP 3 is shown in more detail in FIG. 2. The SCP 3 illustrated here comprises a computer, which comprises a switch control 10, a service logic program (SLP) storage facility 11, and a customer database storage facility 12. The switch control 10 is connected via a set of signaling links 13, 14 to the mobile phone telecommunications network 1. An SMS text MAP message from the servicing MSC 2 of the network 1 is sent to the SCP 3 and is received by the switch control 10 via the signaling link 13. The switch control 10 processes the SMS text MAP message by using it to trigger running of one or more of the SLPs stored in the SLP storage facility 11. For example, an SLP may be run which interrogates the SMS text MAP message to obtain details of the identity of the sender. The SLP then uses this information to interrogate the customer database in the storage facility 12. This contains details of the account of the sender, and the SLP checks the balance of the account to ascertain that the sender has sufficient credit to pay for sending the message to the receiver. If this is the case, the SLP instructs the switch control 10 to change the destination address of the SMS text MAP message to the SMSC 5 of the network. The switch control 10 changes the address and sends the SMS text MAP message to the SMSC 5 via the signaling link 14 and networking MSC 4. The SLP causes the account of the sender held in the storage facility 12 to be debited. The SMSC 5 sends the message onwards to the mobile phone 7 of the receiver. If the sender does not have sufficient credit to pay for sending the message to the receiver, the SLP instructs the switch control 10 to discard the SMS text MAP message, and to send a notification message to the servicing MSC 2 of the network for onward transmission to the sender.

In this embodiment, operation of only one SLP is described. It will be appreciated that the SCP 3 may provide many SLPs, which define other processes undertaken by the SCP, for SMS text messages and other types of messages.

The invention claimed is:

1. A method of operating a mobile phone telecommunications network, comprising the steps of:
  using a servicing mobile switching center (servicing MSC) of the network to receive at least one short message service (SMS) text message and to generate a mobile application part (MAP) message as a result of reception of the SMS text message;
  transmitting the MAP message from the servicing MSC to at least one service control point (SCP) of the network;
  implementing the SCP in the network as a single network element;
  operating the SCP to process the MAP message by determining a subsequent handling of the at least one SMS text message and by interrogating the MAP message to obtain information from the MAP message about a sender of the SMS text message and to determine whether or not there is sufficient credit on an account of the sender to allow sending of the at least one SMS text message onwards towards an intended receiver; and
  using the information in determining the subsequent handling of the at least one SMS text message, wherein if processing of the MAP message by the SCP determines that the MAP message should be sent onwards towards the intended receiver, then the SCP sends the MAP message onwards towards the receiver by sending it directly to a networking mobile switching center (networking MSC).

2. The method according to claim 1, in that the servicing MSC receives the at least one SMS text message from a mobile phone.

3. The method according to claim 1, in that the MAP message generated by the servicing MSC contains information about the at least one SMS text message received by the servicing MSC.

4. The method according to claim 1, in that the MAP message generated by the servicing MSC contains at least part of the at least one SMS text message received by the servicing MSC.

5. The method according to claim 1, in that processing of the MAP message by the SCP comprises the step of determining whether or not the MAP message should be sent onwards towards the intended receiver.

6. The method according to claim 1, in that the information comprises details of an identity of the sender of the at least one SMS text message received by the servicing MSC, and is used in determining whether or not SMS text messages from the sender should be sent onwards towards the intended receiver.

7. The method according to claim 1, in that when processing of the MAP message by the SCP comprises determining that the MAP message should not be sent onwards towards the intended receiver, the SCP discards the MAP message.

8. The method according to claim 1, in that the SCP changes a destination address of the MAP message to send it onwards towards the receiver.

9. The method according to claim 1, in that processing of the MAP message by the SCP comprises the step of charging the sender of the at least one SMS text message received by the servicing MSC.

10. The method according to claim 9, in that processing of the MAP message by the SCP comprises the step of charging the sender of the at least one SMS text message received by the servicing MSC if the MAP message is sent onwards towards the intended receiver.

11. The method according to claim 9, in that processing of the MAP message by the SCP comprises the step of charging the sender of the at least one SMS text message received by the servicing MSC before the MAP message is sent onwards towards the intended receiver.

12. The method according to claim 9, in that the step of using the information is performed by charging the sender of the at least one SMS text message received by the servicing MSC.

13. The method according to claim 12, in that the information comprises details of an identity of the sender of the at least one SMS text message received by the servicing MSC, and is used to access the account of the sender and to charge the sender.

14. The method according to claim 12, in that the information comprises details of a length of the MAP message, and is used to charge the sender.

15. The method according to claim 1, in that processing of the MAP message by the SCP comprises the step of triggering dispatch of a message to the sender of the at least one SMS text message received by the servicing MSC.

16. The method according to claim 15, in that the step of using the information is performed by triggering dispatch of the message to the sender of the at least one SMS text message received by the servicing MSC.

17. The method according to claim 16, in that the information comprises details of an identity of the sender of the at least one SMS text message received by the servicing MSC, and is used to access the account of the sender to determine a credit available, and to trigger dispatch of a message to the sender if the credit is insufficient to allow sending of the message onwards towards the intended receiver.

18. The method according to claim 1, in that processing of the MAP message by the SCP comprises the step of analyzing the MAP message.

19. The method according to claim 1, in that the SCP provides at least one service logic program (SLP) defining at least one process carried out by the SCP.

20. The method according to claim 19, in that processing of the MAP message by the SCP comprises the step of running the at least one SLP.

21. The method according to claim 1, in that the MAP message received by the SCP comprises an SMS text MAP message which is generated by the servicing MSC as a result of receipt of an SMS text message.

22. The method according to claim 21, in that the SCP provides at least one SMS SLP which defines the at least one process carried out by the SCP on the SMS text MAP message.

23. The method according to claim 22, in that processing of the SMS text MAP message by the SCP comprises the step of running at least one SMS SLP.

24. A mobile phone telecommunications network, comprising:
a servicing mobile switching center (servicing MSC) having a message receiver;
a mobile application part (MAP) message generator;
a MAP message transmitter; and
at least one service control point (SCP) implemented as a single network element and having a MAP message receiver and a MAP message processor, the message receiver of the servicing MSC receiving at least one short message service (SMS) text message and the MAP message generator of the servicing MSC generates a MAP message as a result of reception of the SMS text message, and the MAP message transmitter of the servicing MSC sends this to the MAP message receiver of the SCP, the MAP message receiver of the SCP receiving the MAP message, and the MAP message processor of the SCP processing the MAP message by determining whether or not the at least one SMS text message should be sent onwards towards an intended receiver by interrogating the MAP message to obtain information from the MAP message about a sender of the SMS text message and to determine whether or not there is sufficient credit on an account of the sender to allow sending of the at least one SMS text message onwards towards an intended receiver, and by using the information in determining the subsequent handling of the at least one SMS text message, wherein if processing of the MAP message by the SCP determines that the MAP message should be sent onwards towards the intended receiver, then the SCP sends the MAP message onwards towards the receiver by sending it directly to a networking mobile switching center (networking MSC).

25. A service control point (SCP) implemented as a single network element, comprising:
a receiver for receiving at least one mobile application part (MAP) message generated as a result of reception of a short message service (SMS) text message; and
a processor for processing the MAP message by determining whether or not the SMS text message should be sent onwards towards an intended receiver by interrogating the MAP message to obtain information from the MAP message about a sender of the SMS text message and to determine whether or not there is sufficient credit on an account of the sender to allow sending of the at least one SMS text message onwards towards an intended receiver, and by using the information in determining the subsequent handling of the SMS text message, wherein if processing of the MAP message by the SCP determines that the MAP message should be sent onwards towards the intended receiver, then the SCP sends the MAP message onwards towards the receiver by sending it directly to a networking mobile switching center (networking MSC).

26. The SCP according to claim 25, in that the SCP processor provides or accesses software for processing the MAP message.

27. The SCP according to claim 26, in that the processing software comprises at least one service logic program (SLP).

28. The SCP according to claim 27, in that processing of the at least one MAP message by the SCP processor of the SCP comprises running the at least one SLP.

29. The SCP according to claim 27, in that the processing software comprises at least one SMS SLP which defines at least one process carried out by the SCP processor of the SCP on SMS text MAP messages.

30. The SCP according to claim 29, in that processing of the SMS text MAP message by the SCP processor of the SCP comprises running at least one SMS SLP.

* * * * *

UNITED STATES PATENT AND TRADEMARK OFFICE
CERTIFICATE OF CORRECTION

PATENT NO.         : 7,856,239 B2
APPLICATION NO.    : 10/488044
DATED              : December 21, 2010
INVENTOR(S)        : Hosie et al.

Page 1 of 1

It is certified that error appears in the above-identified patent and that said Letters Patent is hereby corrected as shown below:

In Column 1, Line 40, delete "bas" and insert -- has --, therefor.

In Column 2, Line 27, delete "receivers." and insert -- receiver. --, therefor.

In Column 2, Line 45, delete "we" and insert -- the --, therefor.

In Column 4, Line 6, delete "calls" and insert -- call, --, therefor.

In Column 4, Lines 53-54, delete "ruing one or more" and insert -- running one or more SMS --, therefor.

In Column 4, Line 56, delete "tagger" and insert -- trigger --, therefor.

Signed and Sealed this
Twenty-fourth Day of May, 2011

David J. Kappos
*Director of the United States Patent and Trademark Office*